(12) United States Patent
Song

(10) Patent No.: US 8,449,636 B2
(45) Date of Patent: May 28, 2013

(54) EASY RINSING POLISHING COMPOSITION FOR POLYMER-BASED SURFACES

(75) Inventor: Jon Jun Song, Pittsford, NY (US)

(73) Assignee: Ferro Corporation, Cleveland, OH (US)

( * ) Notice: Subject to any disclaimer, the term of this patent is extended or adjusted under 35 U.S.C. 154(b) by 240 days.

(21) Appl. No.: 12/853,097

(22) Filed: Aug. 9, 2010

(65) Prior Publication Data

US 2012/0034851 A1  Feb. 9, 2012

(51) Int. Cl.
*B24D 3/02* (2006.01)
*B24B 1/00* (2006.01)
*B24B 7/19* (2006.01)

(52) U.S. Cl.
USPC .............................................. 51/309; 451/42

(58) Field of Classification Search
USPC ........................................ 451/42, 59; 51/309
See application file for complete search history.

(56) References Cited

U.S. PATENT DOCUMENTS

| | | | |
|---|---|---|---|
| 5,709,755 A | 1/1998 | Kuo et al. | |
| 6,802,877 B2 | 10/2004 | Drury | |
| 7,101,801 B2 | 9/2006 | Ono et al. | |
| 7,294,044 B2 * | 11/2007 | Ferranti | 451/42 |
| 7,467,988 B2 | 12/2008 | Ferranti | |
| 2006/0033088 A1 * | 2/2006 | Kim et al. | 252/586 |
| 2010/0102025 A1 * | 4/2010 | Eagerton | 216/13 |

OTHER PUBLICATIONS

PCT Notification of Transmittal of the International Search Report, International Search Report and the Written Opinion of the International Searching Authority, International Application No. PCT/US 11/39561, filed Jun. 8, 2011, seven pages.

* cited by examiner

*Primary Examiner* — Pegah Parvini
(74) *Attorney, Agent, or Firm* — Rankin, Hill & Clark LLP

(57) ABSTRACT

A polishing composition and method for polishing polymer-based surfaces that can be rinsed from the polished polymer-based surface using water so as to leave substantially less polishing residue behind as compared to conventional polishing compositions. Polishing compositions according to the invention include abrasive particles and a rinsing agent dispersed in water. Polishing compositions according to the invention can be used to polish all types of polymer-based surfaces including, for example, organic polymer-based ophthalmic substrates and clear-coat automotive finishes.

18 Claims, 2 Drawing Sheets

EASY RINSING POLISHING COMPOSITION FOR POLYMER-BASED SURFACES

BACKGROUND OF INVENTION

1. Field of Invention

The present invention relates to a polishing composition and methods of using the same. More particularly, the present invention relates to a polishing composition containing abrasive particles and a rinsing agent, which can be rinsed from polished polymer-based surfaces such as polymeric ophthalmic lenses and automotive clear coat finishes using water so as to leave substantially less polishing residue behind as compared to conventional polishing compositions.

2. Description of Related Art

It is important to manage factors such as material removal rates and surface defect generation when formulating polishing compositions for use in polishing polymer-based surfaces such as, for example, polymeric ophthalmic lenses and automotive clear coat finishes. It is also important to manage how easily it is to rinse the polishing composition from the polymer-based surface after the desired amount of polishing has been accomplished.

Most conventional polishing compositions contain abrasive grains or particles, which are dispersed in a spreadable medium to form a paste or liquid dispersion. The polishing compositions are disposed between a polishing pad and a polymer-based surface to be polished. Relative movement between the polishing pad and the polymer-based surface causes the abrasive particles to mechanically wear away or erode the comparatively softer polymer-based surface and thereby polish it. Such polishing compositions may further contain one or more compounds that chemically alter the polymer-based surface during polishing to further enhance the polishing rate and quality of the polished polymer-based surface.

Conventional polishing compositions for use in polishing polymer-based surfaces typically leave a significant amount of residue behind notwithstanding the use of substantial amounts of rinsing water. This residue can sometimes be seen as a cloudy or hazy film. Microscopic examination shows that this residue comprises significant amounts of abrasive particles, which do not readily rinse away from the polished polymer-based surface. In addition to adversely affecting the appearance of the polished polymer-based surface, the presence of residual abrasive particles can cause undesired surface defects in the polished polymer-based surface if they are not removed. It would be advantageous to have a polishing composition in which the abrasive particles could be rinsed from a polished polymer-based surface using water so as to leave substantially less polishing residue behind as compared to conventional polishing compositions.

BRIEF SUMMARY OF THE INVENTION

The present invention provides a polishing composition and method for polishing polymer-based surfaces. The polishing composition can be used to polish polymer-based surfaces at conventional polishing rates with minimal surface defects, and can be rinsed from the polished polymer-based surface using water so as to leave substantially less polishing residue behind as compared to conventional polishing compositions.

A polishing composition according to the invention comprises abrasive particles and a rinsing agent dispersed in water. In one preferred embodiment, the rinsing agent comprises both a pyrrolidone polymer and an acrylate salt polymer. In another embodiment, the rinsing agent comprises a copolymer formed by polymerizing a pyrrolidone monomer and an acrylic acid monomer. In automotive clear coat finishing applications, the rinsing agent can simply be a pyrrolidone polymer. The abrasive particles preferably comprise calcined alumina. Depending upon the amount of water present, polishing compositions according to the invention can be in the form of a relatively thick paste or liquid slurry. Polishing compositions according to the invention can be used to polish all types of polymer-based surfaces including, for example, organic polymer-based ophthalmic substrates and clear-coat automotive finishes.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

Figure 1:
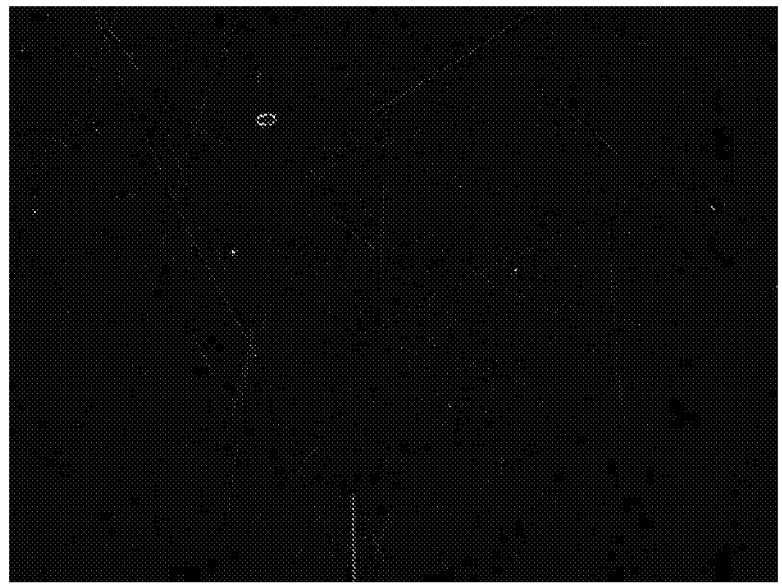
FIG. 1 is a photomicrograph of a polymer-based ophthalmic substrate polished with a polishing composition according to the invention after rinsing with water.

As noted above, polishing compositions according to the invention comprises abrasive particles and a rinsing agent dispersed in water. In the preferred embodiment of the invention, the rinsing agent comprises both a pyrrolidone polymer and an acrylate salt polymer. In an alternative embodiment, the rinsing agent comprises a copolymer formed by polymerizing a pyrrolidone monomer and an acrylic acid monomer. In automotive clear coat finishing applications, the rinsing agent can simply be a pyrrolidone polymer. It will be appreciated that other components such as, for example, surfactants, biocides, pH modifiers, pH buffers, rheology modifiers and other compounds can optionally be present in the polishing compositions according to the invention provided they do not adversely affect the efficiency of the polishing composition, the surface quality produced via polishing or the ease with which the polishing composition can be rinsed from a polished polymer-based surface.

The abrasive particles preferably comprise calcined alumina. The abrasive particles preferably have an average particle size within the range of from about 0.1 µm to about 20 µm. More preferably, the average particle size is within the range of from about 1 µm to about 10 µm. And most preferably, the average particle size is within the range of from about 3 µm to about 7 µm.

Although calcined alumina is preferred for use in the invention, it may be possible to use other known abrasives such as, for example, ceria, copper oxide, iron oxide, nickel oxide, manganese oxide, silica, silicon nitride, silicon carbide, tin oxide, titania, titanium carbide, tungsten oxide, yttrium oxide, zirconia and combinations of the foregoing. It will be appreciated that the abrasive particles can be doped with or contain amounts of other elements. Abrasives are typically produced by high temperature calcination and subsequent milling, but can be produced by other methods (e.g., hydrothermal precipitation).

When the abrasive particles comprise calcined alumina, the abrasive particles are preferably present in an amount from about 1% to about 40% by weight of the entire polishing composition at the time of use. More preferably, the polishing composition comprises from about 10% to about 30% by weight of calcined alumina abrasive particles at the time of use. And, most preferably, the polishing composition comprises from about 20% to about 25% by weight of calcined alumina abrasive particles at the time of use. Those having skill in the art will appreciate that the size, composition and amount of abrasive particles present in the composition can be selected within a wide range in order to suit particular requirements of the end use application.

As noted, polishing compositions according to the invention further comprise a rinsing agent. When the polymer-based surface to be polished comprises an automotive clear coat finish, it is possible for the rinsing agent to simply comprise a pyrrolidone polymer. The preferred pyrrolidone polymer for use in the invention is polyvinylpyrrolidone (PVP). The weight average molecular weight of the PVP is preferably within the range of from about 3,000 to about 60,000, and more preferably within the range of from about 10,000 to about 50,000.

Although PVP is preferred, other substituted pyrrolidone polymers can likely be used. Typical substitutions would be, for example, alkyl, phenyl, ethylene oxide, or propylene oxide substitutions or combinations thereof. In addition, copolymers formed of N-vinylpyrrolidone monomer and vinyl acetate, vinyl amines, dimethylaminoethylmethacrylate, ethyl methacrylate, methyl methacrylate, lauryl methacrylate, methacrylic acid, acrylic acid, carboxylated vinyl acetate, vinyl caprolactam, monomers could also be used.

The pyrrolidone polymer is preferably present in an amount from about 0.05% to about 3% by weight of the polishing composition at the time of use. More preferably, the pyrrolidone polymer is preferably present in an amount from about 0.2% to about 1% by weight of the polishing composition at the time of use. And, most preferably the pyrrolidone polymer is preferably present in an amount of about 0.3% to about 0.7%, or about 0.5%, by weight of the polishing composition at the time of use.

In the preferred embodiment of the invention, the rinsing agent further comprises an acrylate salt polymer. The preferred acrylate salt polymer is ammonium polyacrylate, but other acrylate salt polymers such as sodium polyacrylate, potassium polyacrylate and lithium polyacrylate could also be used.

Furthermore, substituted acrylate salt polymers could be used. Non-limiting examples include alkyl or phenyl substituted acrylates such as methyl methacrylate, lauryl methacrylate and phenyl methacrylate, and amine substituted acrylates such as dimethylaminoethylmethacrylate. In addition, copolymers formed of an acrylate monomer and N-vinylpyrrolidinone, other acrylate monomers, vinyl acetate, vinyl caprolactam, carboxylated vinyl acetate, vinyl amines, acrylamides, styrenes and substituted styrenes could be used.

The acrylate salt polymer is preferably present in an amount from about 0.05% to about 3% by weight of the polishing composition at the time of use. More preferably, the acrylate salt polymer is preferably present in an amount from about 0.2% to about 1% by weight of the polishing composition at the time of use. And, most preferably the acrylate salt polymer is preferably present in an amount of about 0.3% to about 0.7%, or about 0.5%, by weight of the polishing composition at the time of use.

In addition, it is also possible to use a copolymer formed by polymerizing a pyrrolidone monomer (e.g., N-vinylpyrrolidone) and an acrylic acid monomer. The copolymer can be used in place of the pyrrolidone polymer or together with one or both of a pyrrolidone polymer and an acrylate salt polymer. The minimum amount of copolymer necessary to achieve the desired easy rinsing should be used (typically less than about 5% by weight).

The abrasive particles, rinsing agent and other optional components of the polishing composition are preferably dispersed in water. Depending upon the amount of water present, polishing compositions according to the invention can be in the form of a relatively thick paste or liquid slurry. It will be appreciated that polishing compositions according to the invention can be shipped and stored in the form of a dry powder or concentrated aqueous paste, which can be readily dispersed in water with a minimum of mixing in order to prepare an aqueous polishing composition for polishing a polymer-based surface. Thus, the invention further provides a dry powder composition that can be dispersed in water to form an aqueous polishing composition, and a method of polishing a polymer-based surface comprising dispersing a composition comprising abrasive particles and a rinsing agent in water to form an aqueous polishing composition, disposing the aqueous polishing composition between a polishing pad and the polymer-based surface to be polished, and polishing the polymer-based surface with the polishing pad and the aqueous polishing composition to remove a portion of the polymer-based surface and achieve a polished surface. Polishing compositions according to the invention can be used to polish all types of polymer-based surfaces including, for example, organic polymer-based ophthalmic substrates and clear-coat automotive finishes.

As demonstrated in the accompanying Examples, the presence of both a pyrrolidone polymer and an acrylate salt polymer in a polishing composition comprising an aqueous dispersion of abrasive alumina particles synergistically improves the ability by which the polishing composition can be rinsed away from the polished polymer-based surface after it has been polished. This synergistic effect is both unexpected and beneficial. The effect is also apparent when a copolymer formed by polymerizing N-vinylpyrrolidone monomer and an acrylic acid monomer is used, but to a lesser degree. For automotive clear-coat finishes, the mere presence of a pyrrolidone polymer in the composition improves the ease by which the composition can be rinsed from the surface using water.

In the organic polymer-based ophthalmic lens polishing industry, a cleaner post-polishing polymer-based surface is advantageous for subsequent down-stream processing steps, such as the application of antireflective coatings etc. Furthermore, it reduces the amount of rinsing water, rinsing time and rinsing steps and compositions that must be utilized in order to obtain a satisfactorily clean surface.

In the automotive industry, use of polishing compositions according to the invention can lead to cleaner post-polishing clear coat finishes. This allows the automotive finish to have a shinier, aesthetically pleasing finish using less water and less buffing/cleaning.

In order to fairly compare the ease by which polishing compositions can be rinsed from polymer-based surfaces, a Standard Polishing and Rinsability Test was devised. Accordingly, throughout the instant specification and in the appended claims, the term "Standard Polishing and Rinsability Test" refers to the test procedure described below:

Standard Polishing and Rinsability Test

The polishing composition to be tested is used to polish an organic polymer-based ophthalmic substrate known as CR-39®, which can be obtained from Essilor of America, Inc. of Petersburg, Fla. The CR-39® ophthalmic substrate material is believed to be an allyl digylcol carbonate polymer and is well known in the art. The ophthalmic substrate is in a circular concave-convex shape. The diameter of the circular shape is 67 mm, and the average thickness is 10 mm before polishing. The concave side is polished.

The ophthalmic substrates is polished using a Coburn 505 Optical Polisher equipped with a bowl type slurry reservoir. The polishing pad is a SHAWSHEEN 349-7 Premium Grade Yellow Polishing Pad obtained from PSI of Odessa, Fla. The Optical Polisher machine settings must be 20.0 psi pressure and 742 RPM. The reservoir must be equipped with a recirculating pump. The slurry reservoir must be charged with a fresh 2,000 gram supply of the polishing composition (slurry) for each polishing test. The slurry must be recirculated at a flow rate of 4.54 liters/minute. The slurry must be chilled throughout each polishing test to a temperature within the range of 10-15° C. The substrates must not be fined between polishing cycles.

The ophthalmic substrate must be polished for 6 minutes. The polishing composition must remove material from the ophthalmic substrate at a rate exceeding 18 mg/min, otherwise the polishing composition is deemed too weak for acceptable use.

After polishing, the polymer-based ophthalmic substrate is placed in an ultrasonic bath containing ambient (~22.5° C.) deionized water for 30 seconds to rinse away the polishing slurry residue. After rinsing, the polished polymer-based ophthalmic substrate is air dried.

To determine rinsability, photomicrographs are obtained of the polished surface of ophthalmic substrate using an optical microscope. The resolution of the photomicrographs must be 50 times. A total of 3 photomicrographs are taken of the substrate, and a box is drawn on each of the photomicrographs to define an area measuring 3 mm×3 mm such that each box encloses the most number of particles visible on each photomicrograph. The number of abrasive particles observed in the each of the 3 boxes is counted, and the average of the 3 counts is reported as the "Standard Polishing and Rinsability Test Residue Count."

Conventional polishing compositions containing abrasive particles dispersed in water typically leave a substantial amount of abrasive particle residue on the surface of polymer-based substrates after rinsing. When reported in terms of the Standard Polishing and Rinsability Test Residue Count, such conventional polishing compositions typically leave at least 10,000/mm². In contrast, polishing composition according to the invention leave substantially less abrasive particle residue on the surface of polymer-based substrates after rinsing. When reported in terms of the Standard Polishing and Rinsability Test Residue Count, polishing compositions according to the invention leave no more than about 200/mm², more preferably no more than 100/mm² and most preferably no more than 10/mm².

The following examples are intended only to illustrate the invention and should not be construed as imposing limitations upon the claims.

Example 1

Four polishing compositions (Slurry 1, Slurry 2, Slurry 3 and Slurry 4) were prepared by dispersing calcined aluminum oxide abrasive particles (Alumina), a surfactant and optionally polyvinylpyrrolidone (PVP) and/or ammonium polyacrylate (PAA) in deionized, distilled water in the amounts shown in Table 1 below in terms of weight percent based on the total weight of the polishing compositions.

TABLE 1

|  | Alumina | PVP | PAA | Surfactant | Particles/mm² |
| --- | --- | --- | --- | --- | --- |
| Slurry 1 | 25 | 0.5 | 0.5 | 2.08 | 2 |
| Slurry 2 | 25 | 0.5 | 0 | 2.08 | 151 |
| Slurry 3 | 25 | 0 | 0.5 | 2.08 | 181 |
| Slurry 4 | 25 | 0 | 0 | 2.08 | 997 |

The alumina had an average particle size within the range of 3 to 7 μm. The PVP had a weight average molecular weight of about 10,000. The PAA had a weight average molecular weight of about 3,500. The Surfactant used in each case was TETRONIC 1107, which was obtained from BASF Corporation of Florham Park, N.J. The Surfactant is believed to be an ethoxylated and propoxylated ethylenediamine, and is used as a polishing rate accelerant in polishing compositions for use in polishing polymer-based surfaces. After Slurries 1-4 were formulated, each slurry was separately used to polish a CR-39® substrate in accordance with the Standard Polishing and Rinsability Test described above.

Figure 2:
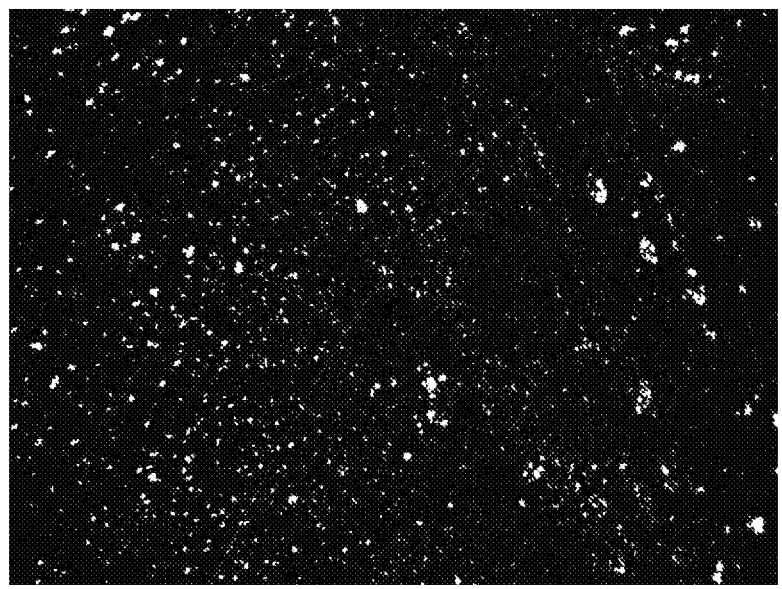
FIG. 2 is a photomicrograph of a polymer-based ophthalmic substrate polished with a comparative polishing composition after rinsing with water.
Figure 3:
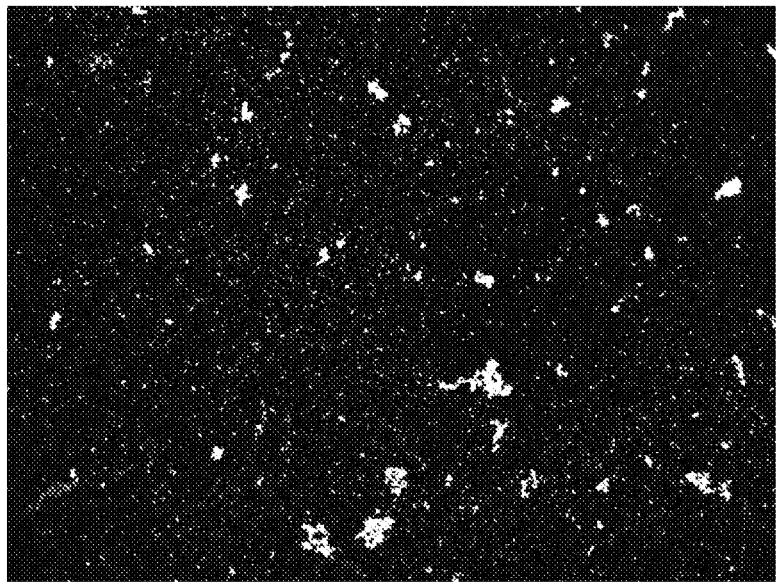
FIG. 3 is a photomicrograph of a polymer-based ophthalmic substrate polished with another comparative polishing composition after rinsing with water.

FIG. 1 is a photomicrograph of the polymer-based ophthalmic substrate polished with Slurry 1. FIG. 2 is a photomicrograph of the polymer-based ophthalmic substrate polished with Slurry 2. FIG. 3 is a photomicrograph of the polymer-based ophthalmic substrate polished with Slurry 3. And, FIG. 4 is a photomicrograph of the polymer-based ophthalmic substrate polished with Slurry 4.

As shown in FIG. 1, almost no detectible polishing composition residue was evident on the surface of the polymer-based ophthalmic substrate that was polished with Slurry 1, which was the only slurry that contained both PVP and PAA. The Standard Polishing and Rinsability Test Residue Count for Slurry 1 was 2/mm².

Figure 4:
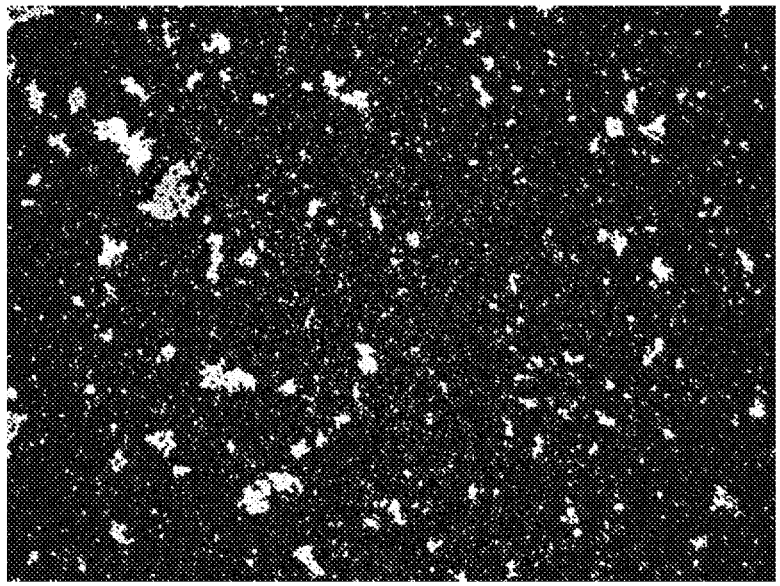
FIG. 4 is a photomicrograph of a polymer-based ophthalmic substrate polished with yet another comparative polishing composition after rinsing with water.

As shown in FIGS. 2-4, polishing composition residue is clearly evident on the surfaces of each of the polymer-based ophthalmic substrates that were polished with Slurries 2-4, respectively, none of which contained both PVP and PAA. The presence of both PVP and PAA is required in order to obtain the residue-free surface. The Standard Polishing and Rinsability Test Residue Count for Slurries 2-4 was 151/mm², 182/mm² and 997/mm², respectively.

Example 2

A polishing composition (Slurry 5) was prepared by dispersing:
(i) calcined aluminum oxide abrasive particles (Alumina);
(ii) a surfactant; and
(iii) a copolymer formed by polymerizing a pyrrolidone monomer and an acrylic acid monomer;
together in deionized, distilled water in the amounts shown in Table 2 below in terms of weight percent based on the total weight of the polishing compositions.

TABLE 2

|  | Alumina | PVP | PAA | Copolymer | Surfactant | Particles |
| --- | --- | --- | --- | --- | --- | --- |
| Slurry 5 | 25 | 0 | 0 | 0.1 | 2.08 | 123/mm² |

The alumina had an average particle size within the range of 3 to 7 μm. The copolymer was a vinyl pyrrolidone/acrylic acid/lauryl methacrylate copolymer (CAS#83120-95-0) available from International Specialty Products of Wayne, N.J. under the STYLEZE® 2000 trade designation. The Surfactant used was TETRONIC 1107, which was obtained from BASF Corporation of Florham Park, N.J. After Slurry 5 was formulated, the slurry was used to polish a CR-39® substrate in accordance with the Standard Polishing and Rinsability Test previously described.

A photomicrograph of the polymer-based ophthalmic substrate polished with Slurry 5 showed that very little, if any, polishing residue was evident on the surface of the substrate polished with Slurry 5, indicating that a copolymer formed by polymerizing a pyrrolidone monomer and an acrylic acid monomer can also be used to obtain a substantially residue-free surface. The Standard Polishing and Rinsability Test Residue Count for Slurry 5 was 123/mm$^2$.

Example 3

Two commercially available plastic lens polishing compositions, namely 714Y available from Ferro Corporation and V2100 available from Praxair Corporation, were tested in accordance with Standard Polishing and Rinsability Test previously described. Both of the commercially available compositions are believed to contain about 25($\pm$1.5) % by weight alumina particles. And neither of the commercially available composition is believed to contain any polyvinylpyrrolidone, ammonium polyacrylate or copolymers thereof. For both commercially available compositions, the number of particles per square millimeter exceeded 10,000 when tested in accordance with the Standard Polishing and Rinsability Test.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A method of polishing a polymer-based surface comprising:
    disposing a polishing composition between a polishing pad and the polymer-based surface to be polished; and
    polishing the polymer-based surface with the polishing pad and the polishing composition until a polished polymer-based surface is obtained;
    wherein the polymer-based surface to be polished is an organic polymer-based ophthalmic substrate,
    wherein the polishing composition comprises an aqueous dispersion of abrasive particles and a rinsing agent,
    wherein the rinsing agent is selected from the group consisting of
        (i) a pyrrolidone polymer in combination with an acrylate salt polymer, and
        (ii) a copolymer formed by polymerizing a pyrrolidone monomer and an acrylic acid monomer, and
    wherein the polishing composition is capable of producing a Residue Count of 200/mm2 or less when tested in accordance with the Standard Polishing and Rinsability Test.

2. The method according to claim 1 wherein the abrasive particles comprise one or more selected from the group consisting of alumina, ceria, copper oxide, iron oxide, nickel oxide, manganese oxide, silica, silicon nitride, silicon carbide, tin oxide, titania, titanium carbide, tungsten oxide, yttrium oxide and zirconia.

3. The method according to claim 1 wherein the abrasive particles have an average particle size within the range of from about 0.1 μm to about 20 μm.

4. The method according to claim 1 wherein the abrasive particles consist essentially of calcined alumina.

5. The method according to claim 4 wherein the calcined alumina abrasive particles are present in an amount of from about 1% to about 40% by weight of the polishing composition.

6. The method according to claim 1 wherein the pyrrolidone polymer is polyvinylpyrrolidone.

7. The method according to claim 6 wherein the polyvinylpyrrolidone is present in an amount of from about 0.05% to about 3% by weight of the polishing composition.

8. The method according to claim 1 wherein the acrylate salt polymer is ammonium polyacrylate.

9. The method according to claim 8 wherein the ammonium polyacrylate is present in an amount of from about 0.05% to about 3% by weight of the polishing composition.

10. The method according to claim 1 further comprising the step of dispersing the abrasive particles and the rinsing agent in water to form the polishing composition used in the disposing step.

11. A method of polishing a polymer-based surface comprising:
    disposing a polishing composition between a polishing pad and the polymer-based surface to be polished; and
    polishing the polymer-based surface with the polishing pad and the polishing composition until a polished polymer-based surface is obtained;
    wherein the polymer-based surface to be polished is a clear-coat finish on a part for a motor vehicle,
    wherein the polishing composition comprises an aqueous dispersion of abrasive particles and a rinsing agent,
    wherein the rinsing agent is selected from the group consisting of
        (i) a pyrrolidone polymer
        (ii) a pyrrolidone polymer in combination with an acrylate salt polymer, and
        (iii) a copolymer formed by polymerizing a pyrrolidone monomer and an acrylic acid monomer, and
    wherein the polishing composition is capable of producing a Residue Count of 200/mm2 or less when tested in accordance with the Standard Polishing and Rinsability Test.

12. The method according to claim 11 wherein the abrasive particles consist essentially of calcined alumina.

13. The method according to claim 12 wherein the calcined alumina abrasive particles are present in an amount of from about 1% to about 40% by weight of the polishing composition.

14. The method according to claim 11 wherein the pyrrolidone polymer is polyvinylpyrrolidone.

15. The method according to claim 11 wherein the polyvinylpyrrolidone is present in an amount of from about 0.05% to about 3% by weight of the polishing composition.

16. The method according to claim 11 wherein the rinsing agent is a pyrrolidone polymer in combination with an acrylate salt polymer, and wherein the acrylate salt polymer is ammonium polyacrylate.

17. The method according to claim 16 wherein the ammonium polyacrylate is present in an amount of from about 0.05% to about 3% by weight of the polishing composition.

18. A polishing composition comprising:
- calcined alumina abrasive particles having an average particle size within the range of from about 0.1 μm to about 20 μm, said calcined alumina particles being present in an amount of from about 1% to about 40% by weight of the polishing composition;
- polyvinylpyrrolidone having a weight average molecular weight of from about 3,000 to about 60,000, said polyvinylpyrrolidone being present in an amount of from about 0.05% to about 3% by weight of the polishing composition;
- an ammonium, sodium, potassium or lithium salt of a polyacrylate in an amount of from about 0.05% to about 3% by weight of the polishing composition; and
- water;
- wherein the polishing composition is capable of producing a Residue Count of 200/mm2 or less when tested in accordance with the Standard Polishing and Rinsability Test.

* * * * *